No. 640,212. Patented Jan. 2, 1900.
H. A. MARTIN.
ICE CREAM FREEZER.
(Application filed Sept. 7, 1899.)
(No Model.)

Witnesses
Clarence H. Walker
O. F. Shepard

H. A. Martin, Inventor
By his Attorneys,
C. A. Snow & Co.

UNITED STATES PATENT OFFICE.

HENRY A. MARTIN, OF ATLANTA, GEORGIA.

ICE-CREAM FREEZER.

SPECIFICATION forming part of Letters Patent No. 640,212, dated January 2, 1900.

Application filed September 7, 1899. Serial No. 729,759. (No model.)

*To all whom it may concern:*

Be it known that I, HENRY A. MARTIN, a citizen of the United States, residing at Atlanta, in the county of Fulton and State of Georgia, have invented a new and useful Ice-Cream Freezer, of which the following is a specification.

This invention relates to ice-cream freezers of that class embodying an outer and an inner freezing agent, and has for its object to provide improved means for applying the freezing agents to the cream, so as to obviate the labor of agitating the same.

It is further designed to prevent the cream from adhering to the inner sides of the cream-can, to produce a smooth ice-cream free from lumps, and also to facilitate the removal of the inner freezing agent.

To these ends the present invention consists in the combination and arrangement of parts, as will be hereinafter more fully described, shown in the accompanying drawings, and particularly pointed out in the appended claims, it being understood that changes in the form, proportion, size, and minor details of construction may be made within the scope of the appended claims without departing from the spirit or sacrificing any of the advantages of the invention.

Figure 1:
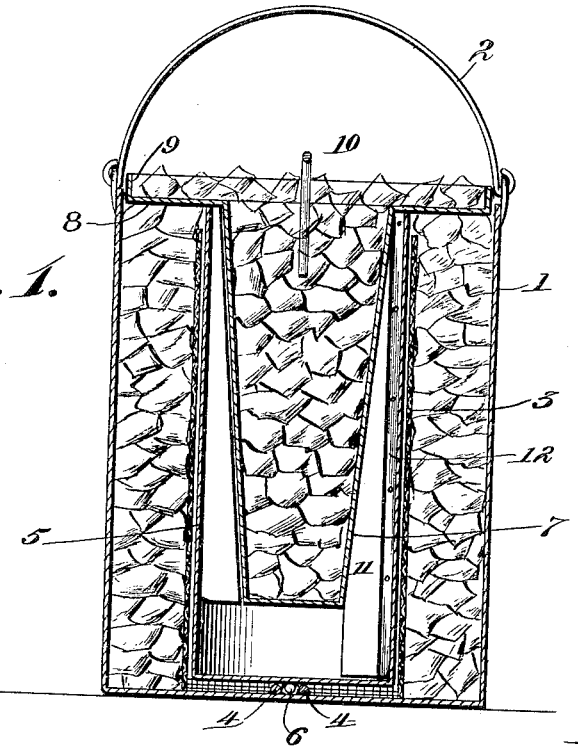
Figure 2:
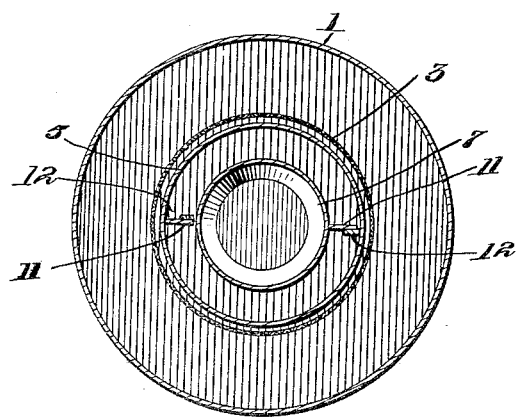
Figure 3:
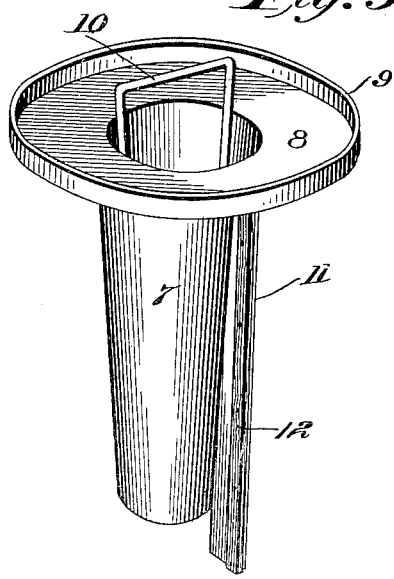

In the drawings, Figure 1 is a central longitudinal sectional view of an ice-cream freezer constructed in accordance with the present invention. Fig. 2 is a horizontal transverse sectional view thereof. Fig. 3 is a detail perspective view of the can or receptacle for containing the inner freezing agent.

Corresponding parts in the several figures of the drawings are designated by like characters of reference.

Referring to the accompanying drawings, 1 designates a can or receptacle for containing the cream-can and the freezing agents and is provided with a suitable bail-handle 2 for convenience in transporting the device from place to place. This can is preferably cylindrical in shape and formed of metal, although a wooden bucket or tub may be employed without impairing the operation of the device. Located centrally within the outer receptacle is an upright cylindrical casing 3, which is open at its upper end and is formed of wire-screen or other suitable foraminous or perforate material. Extending across the bottom of the outer receptacle and diametrically within the casing 3 is a pair of parallel ribs 4, the purpose of which will be hereinafter more fully described.

Loosely fitted within the casing 3 is the cylindrical cream-can 5, which is closed at the bottom and open at the upper end thereof. Extending diametrically across the exterior of the bottom of the cream-can is a rib 6, which is adapted to fit between the parallel ribs upon the inner side of the bottom of the outer receptacle, and thereby prevent turning of the cream-can or inner receptacle.

The means for containing the inner freezing agent comprises an inverted substantially conical can 7, which is closed at its lower end and open at the top thereof. As best indicated in Fig. 1 of the drawings, this conical can is fitted within the cream-can, terminating short of the bottom thereof, and provided at its upper open end with an outer annular flange 8, having an upstanding peripheral rim 9. This flange rests upon the upper end of the cream-can, so as to space the bottom of the conical can above that of the cream-can, and also forms a cover both for the cream-can and the outer receptacle. A suitable handle 10, preferably formed of wire in substantially inverted-U shape, having the opposite ends secured to the inner sides of the can, is provided, whereby the insertion and removal of the inner receptacle are facilitated. Diametrically opposite scraping-wings 11 are provided, one upon the outer side of the inner receptacle and one upon the inner side of the cream-can, the latter wing being equal in length to the inner receptacle and the former wing extending the entire length of the cream-can, for a purpose as will be hereinafter more fully described. Each wing is provided with a wooden strip 12, extending the entire length of the wing and projecting beyond the outer longitudinal edge thereof, and also forming substantially soft scraping edges, so as to prevent scratching off portions of the adjacent surfaces.

In the operation of the device the outer receptacle is filled with cracked ice and salt, which is placed exteriorly of the inner perforate casing 3, after which the cream-can is placed within said casing. The inner conical receptacle is then filled with ice and salt and placed within the cream-can, whereby the cream is subjected to the action of the outer and inner freezing agents. Also the pan formed by the annular flange 8 at the top of the inner receptacle is filled with ice, so that the cream is entirely incased within the freezing agents. After the parts have been thus assembled the device is permitted to stand a few minutes, and then the inner receptacle is given a few turns in opposite directions by means of the handle 10, so as to prevent the cream from freezing to the inner sides of the cream-can and also to break up any lumps which may form, and thereby produce an exceedingly smooth and pleasant ice-cream. It will now be understood that the scraping-wings are of different lengths, so as to scrape the entire length of the inner side of the cream-can and the outer side of the inner receptacle, and, furthermore, that the edges of the wings are provided with wooden strips, so as to prevent said wings from scraping off portions of the adjacent walls, respectively, and depositing the scrapings into the cream. When the cream has become frozen sufficiently hard, the inner receptacle is given a few turns, so as to loosen the wings from the cream, and is then withdrawn, after which the cream-can may be removed. The perforate casing 3 terminates short of the upper edge of the can, so as to afford means for grasping the can to remove the latter.

It will be noted that the inner perforate casing permits of the ice or freezing agent having direct action upon the exterior of the cream-can and at the same time is held in place, so as to permit of the same cream-can or another can being replaced without again packing the outer can with ice. Furthermore, as the rib 6 on the cream-can fits snugly between the two ribs 4 upon the bottom of the outer receptacle, said cream-can is held against being turned when the inner receptacle is operated to loosen the cream.

Having thus described the invention, what is claimed, and desired to be secured by Letters Patent, is—

1. In an ice-cream freezer of the class described, the combination with an outer receptacle for containing a freezing agent, a cream-can located within the receptacle, an inner receptacle for containing a freezing agent and of shorter length than the cream-can, an outwardly-projecting annular flange provided at the upper end of the inner receptacle, resting upon the upper edge of the cream-can, and supporting the inner receptacle above the bottom of the cream-can, a scraper-blade carried by the inner wall of the cream-can and equal in length to the inner receptacle, another scraper-blade carried by the exterior of the inner receptacle and equal in length to the cream-can, and a handle for turning the inner receptacle, substantially as and for the purpose set forth.

2. In an ice-cream freezer of the class described, the combination with an outer receptacle for containing a freezing agent, and provided upon the inner side of the bottom thereof, with a pair of spaced parallel ribs, a cream-can having a transverse rib provided upon the outer side of the bottom thereof, and fitting between the ribs of the outer receptacle, and an inner receptacle for containing a freezing agent, adapted to be inserted within the cream-can, and provided with a handle for turning the inner receptacle, substantially as and for the purpose set forth.

In testimony that I claim the foregoing as my own I have hereto affixed my signature in the presence of two witnesses.

HENRY A. MARTIN.

Witnesses:
I. S. MITCHELL, Jr.,
ELMER HOLLAND.